United States Patent

[11] 3,600,089

[72] Inventor Gerard O. Walter
Skillman, N.J.

[21] Appl. No. 790,349
[22] Filed Jan. 10, 1969
[45] Patented Aug. 17, 1971
[73] Assignee RCA Corporation

[54] FILM MERGING UNIT
6 Claims, 6 Drawing Figs.

[52] U.S. Cl. ........ 355/99, 355/40, 355/41, 355/42, 355/43
[51] Int. Cl. ........ G03b 27/04, G03b 27/52
[50] Field of Search ........ 355/99, 100, 101, 102, 107, 106, 108, 109, 111, 40, 41, 46, 95, 96, 42, 43

[56] References Cited

UNITED STATES PATENTS

| | | | |
|---|---|---|---|
| 2,740,324 | 4/1956 | Cahill, Jr. .......... | 355/40 |
| 2,744,443 | 5/1956 | Higonnet et al. .......... | 355/43 |
| 2,752,818 | 7/1956 | Gehring .......... | 355/43 X |

*Primary Examiner*—Samuel S. Matthews
*Assistant Examiner*—Richard M. Sheer
*Attorney*—H. Christoffersen

ABSTRACT: A film merging unit that automatically updates an old master film with data contained on an updating film by producing a new film with the old and the new data correctly merged thereon. A control device is present for reading a control strip containing coded marks and producing control signals to activate selected drive mechanism to sequence the relative positionings of the films with respect to the printing station.

INVENTOR
GERARD O. WALTER

BY John T. O'Halloran
ATTORNEY

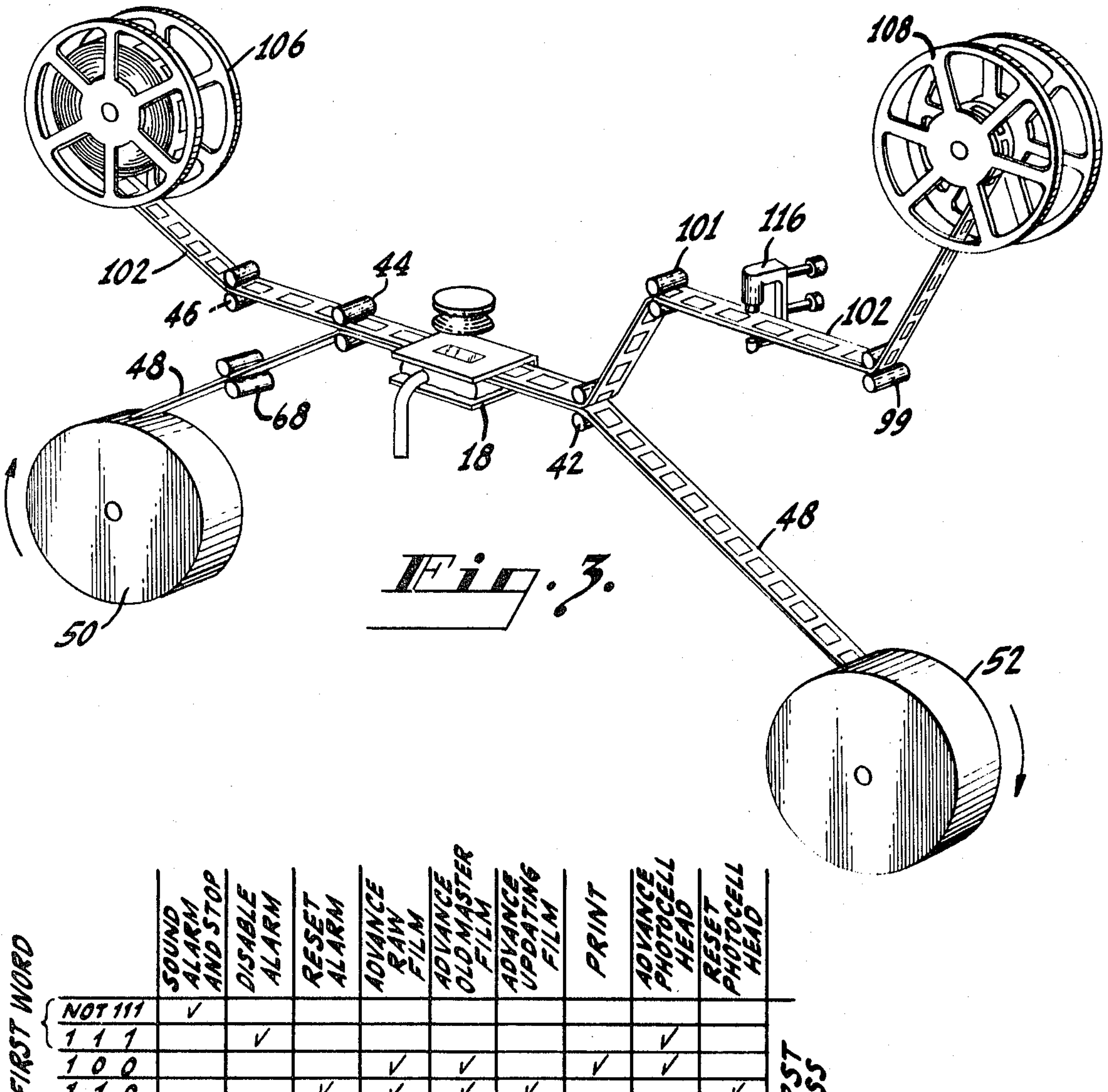

FIG. 3.

| | | Sound alarm and stop | Disable alarm | Reset alarm | Advance raw film | Advance old master film | Advance updating film | Print | Advance photocell head | Reset photocell head |
|---|---|---|---|---|---|---|---|---|---|---|
| First pass | First word: NOT 111 | ✓ | | | | | | | | |
| First pass | First word: 1 1 1 | | ✓ | | | | | | ✓ | |
| First pass | 1 0 0 | | | | ✓ | ✓ | | ✓ | ✓ | |
| First pass | 1 1 0 | | | ✓ | ✓ | ✓ | ✓ | | | ✓ |
| First pass | 0 0 1 | | | ✓ | ✓ | | ✓ | | | ✓ |
| First pass | 0 1 0 | | | | | ✓ | | | ✓ | |
| First pass | 0 0 0 | | | ✓ | | | ✓ | | | ✓ |
| Second pass | First word: NOT 111 | ✓ | | | | | | | | |
| Second pass | First word: 1 1 1 | | ✓ | | | | | | ✓ | |
| Second pass | 1 0 0 | | | | ✓ | | | | ✓ | |
| Second pass | 1 1 0 | | | ✓ | ✓ | | ✓ | ✓ | | ✓ |
| Second pass | 0 0 1 | | | ✓ | ✓ | | ✓ | ✓ | | ✓ |
| Second pass | 0 1 0 | | | | | | | | ✓ | |
| Second pass | 0 0 0 | | | ✓ | | | ✓ | | | ✓ |

FIG. 5.

INVENTOR
GERARD O. WALTER

BY John T. O'Halloran
ATTORNEY

INVENTOR
GERARD O. WALTER
BY John T. O'Halloran
ATTORNEY

INVENTOR
GERARD O. WALTER

BY John T. O'Halloran
ATTORNEY

FILM MERGING UNIT

BACKGROUND OF THE INVENTION

Presently many records are stored photographically, such as on normal size film or on microfilm. In such storage systems, the master films are typically organized in a serial number with data appearing sequentially in consecutive frames. Each frame may correspond to a page of data. The data may, for example, comprise pages in a maintenance manual, a dictionary, an encyclopedia, etc. Such stored data has to be updated at times, such as by adding new data frames, by deleting old data frames, or doing both. In the past, this updating required the finding of the frames to be corrected and the replacing of these frames such as by cementing new frames into the film strip. In such prior art techniques, this updating is done manually. Such a manual process not only takes a long time, but is subject to error, particularly when updating microfilm. Furthermore, the cemented film tends to be weak and subject to breakage.

Recently, there have been developed electronic photocomposition machines. One such electronic photocomposition machine produces character images on the face of a cathode ray tube by building up each character from a plurality of substantially linear scanlines that form slices of the character. The machine then images the characters onto photographic film. The character images are grouped into pages of data on the film. The film is then developed and processed to provide printing plates, such as photo-offset plates. Such photocomposing machines are capable of working with any size film with minor modifications made to the machines.

The use of such electronic photocomposing machines permit reference manuals, maintenance manuals, telephone books, etc. to be phototypeset in a relatively short time. An added advantage of such machines is that coded control information marks may be added automatically to any film strip produced by the machines. Such coded control information marks permit master copies of stored data to be automatically updated.

Summary of the Invention

A film merging unit includes a printing station for transferring data frames from an old master film onto a raw film, and for transferring data frames from an updating film onto the raw film. The transfer is done under the control of control means that includes a control strip containing coded control marks for controlling the sequence in which the data frames are transferred to the raw film.

Brief Description of the Drawings

FIG. 3 is a schematic diagram of a portion of the film merging unit of FIG. 1, as operated in the second pass mode;

FIG. 5 is a table of the various control signals produced in the control electronic unit of FIG. 3.

Detailed Description

Figures 1, 2:
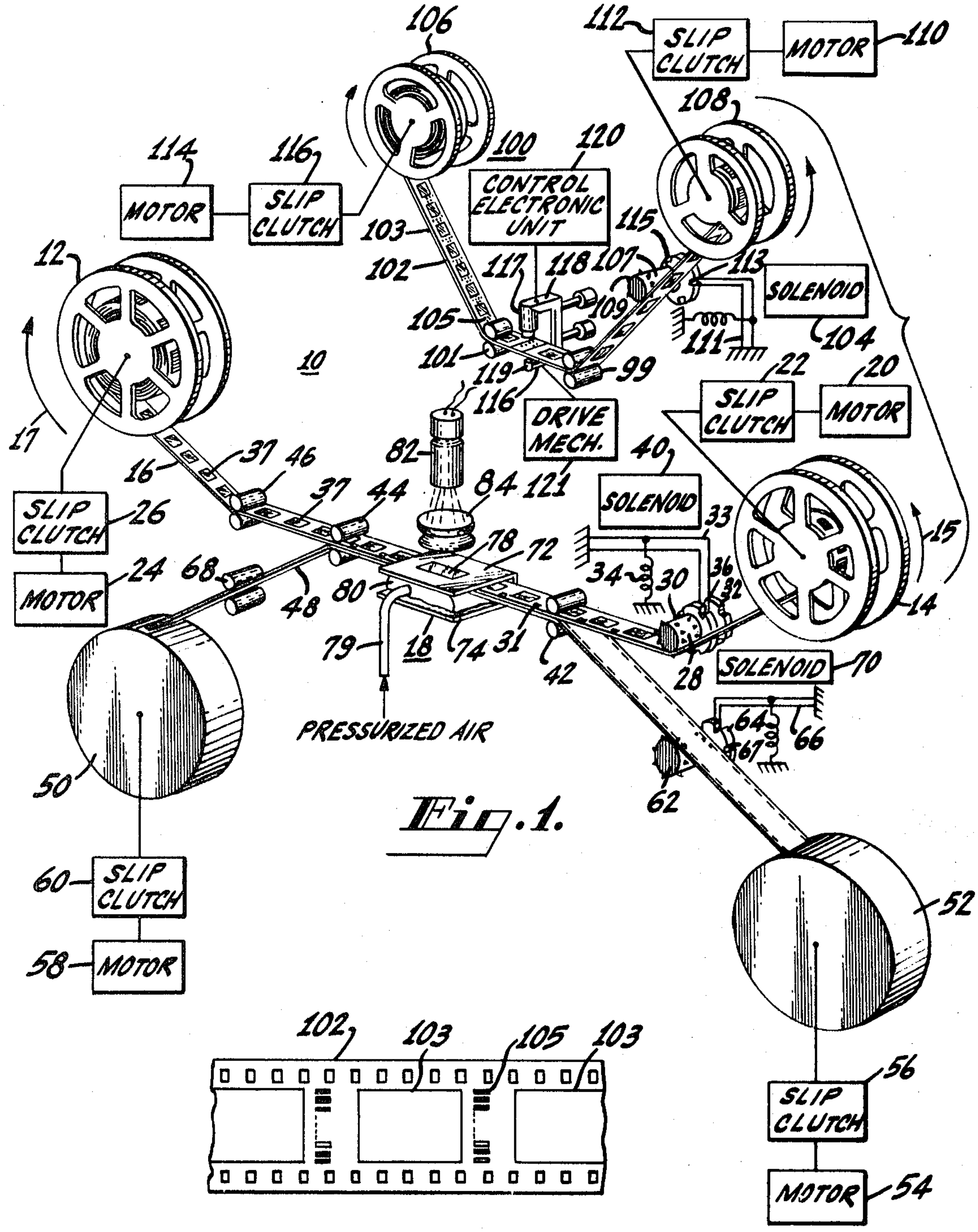
FIG. 1 is a schematic diagram of a two-pass film merging unit embodying the invention, as operated in the first pass mode.
FIG. 2 is a plan view of a film data frame containing coded information control marks.

In FIG. 1 there is shown one embodiment of a film merging unit 10. This embodiment of the invention is a two-pass unit, that is, two passes or operations are needed to provide an updated film. On the first pass, data frames from an old master film 16 that are to remain unchanged are transferred to a raw film 48. On the second pass, data frames from an updating film 102 are transferred to the raw film 48. The combination of the two passes produce the resultant updated film.

The film merging unit 10 includes a supply reel 12 and a take up reel 14 for the old master film 16 that is to be updated. The film 16 is threaded onto the supply and take up reels for movement past a printing station 18. Driving means for controlling the motion of the old master film 16 past the station 18 includes a motor 20 that is connected through a slip clutch mechanism 22 to the shaft of the take up reel 14. The motor 20 tends to rotate the take up reel 14 in the direction of the arrow 15 shown in FIG. 1. The driving means also includes a motor 24 that is coupled through a slip clutch 26 to the shaft of the supply reel 12. The motor 24 and slip clutch 26 tend to rotate the supply reel 12 in a direction opposite to the rotation of the take up reel 14, as shown by the arrow 17 in FIG. 1. When the old master film 16 is run in a forward direction, that is when the take up reel 14 is rotated counterclockwise, the energizing current supplied to the motor 24 is less than that supplied to the motor 20 so that the motor 20 tends to exert a greater force on the old master film 16 than the motor 24. When the old master film is moved in the reverse direction, the motor 24 exerts a greater force than the motor 20. In either direction of motion, the film 16 is kept taut by the drag of one slip clutch.

The driving means also includes a sprocket wheel 28 having a plurality of sprocket teeth 30 that are threaded into the sprocket holes 31 on the old master film 16. A rotary cam 32 is attached to the shaft of the sprocket wheel 28 to rotate in unison therewith. A pawl 33 is biased by a spring 34 to fit into any of a plurality of notches 36 on the periphery of the cam 32. The pawl 33 is pivoted to be pulled out of the notches 36 by the activation of a solenoid 40. When the pawl 33 is momentarily removed from a notch 36, the old master film is moved in one direction by one of the motors 20 or 24. Upon the deactivation of the solenoid 40, the film 16 is moved by its driving means until the pawl 33 again slides into one of the notches 36. The pawl 33 prevents further movement of the film 16. The force exerted by the driving motors is not sufficient to cause tearing of the film web between the sprocket holes.

The spacing between each notch 36 is selected to cause the film 16 to move incrementally in steps. Each step is equivalent to moving the film 16 exactly one data frame 37. The film 16 itself is one continuous strip that is divided into a plurality of sequential data frames 37. The film 16 is guided by pairs of rollers 42, 44, and 46 past the printing station 18. Of course, driving means other than that described may also be utilized in the unit 10. For example, stepping motors may also be utilized. Additionally, a geneva drive mechanism may be substituted for the rotary cam and pawl arrangement of FIG. 1 to move the film one data frame.

Also guided past the printing station 18 in the first pass mode of operation of the unit 10 is a strip of raw film 48 that is supplied by a supply reel 50 and taken up on a take up reel 52. These reels are completely light tight to prevent exposure of the raw film 48. Additionally, the entire unit 10 is enclosed in a light tight compartment (not shown) for the same reason. The driving means for the raw film 48 is identical to that for the master film 16 and includes a motor 54 coupled through a slip clutch mechanism 56 to the shaft of the take up reel 52 as well as a motor 58 coupled through a slip clutch mechanism 60 to the shaft of the supply reel 50. Movement of the raw film strip 48 is prevented by a sprocket wheel 62 which is attached to a rotary cam 64 having a spring biased pawl 66 inserted into one of a plurality of notches 67 on the cam 64. The spring bias pawl 66 is pivoted out of the notch 67 to permit the film 48 to move by the activation of a solenoid 70. The notches are spaced to permit movement of the film 48 in steps of one data frame. The raw film 48 is guided by a pair of rollers 68 up to the rollers 44 so that the old master film 16 and the raw film stock 48 are in close contact when passing through the printing station 18.

The printing station 18 includes a pair of metal baffle plates 72 and 74 between which the old master film 16 and the raw film 48 are guided for contact printing of the data frames from the film 16 onto the raw film 48. The metal plate 74 may, for example, be solid, whereas the plate 72 has an aperture which is covered by a transparent piece of glass 78. The glass 78 may, for example, be the same size as a data frame and the baffle plates 72 and 74 prevent more than one data frame from being exposed on the raw film 48. A plastic bag 80 is inserted between the plates 72 and 74 in a relaxed condition and a source of pressurized air (not shown) is coupled to an orifice 79 in the plastic bag 80. When pressurized air fills the plastic bag 80, the master film 16 and the raw film 48 are brought into close contact with each other. Simultaneously, a pulse of light from a light source 82 is projected through a condensing lens 84 onto the glass plate 78 to cause transfer of the image on the old master film 16 onto the raw stock film 48. Of course, means other than the plastic bag 80 may be utilized to force the films 16 and 48 into intimate contact with each other. For example, a soft rubber cushion may also be utilized.

Also included in the film merging unit 10 are control means 100. The control means 100, in the embodiment of FIG. 1, includes an updating film 102 having a plurality of coded control information marks 105 printed thereon. The updating film 102, as shown in FIG. 2, has a plurality of data frames 103 that are included in the film 102 to replace, or be added to, the data frames in the old master film 16. The data frames 103 do not cover the entire film strip 102 and the upper margins between the data frames include coded control information marks 105. The coded control information marks 105 occur in groups of threes. A white box in FIG. 2 in these groups represents a binary "1" whereas a black box represents a binary "0". For convenience, the signals derived from shining light through these boxes are given binary designations 1 1 1, 1 0 0, etc. The marks 105 are printed in sequence across the film 102. It is, of course, apparent that the control marks 105 may be printed on the side margins, the lower margins, etc., as desired.

The updating film 102 is supplied by a supply reel 106 and taken up on a take up reel 108. The driving means for the film 102 is identical to that for the film 16 and includes a motor 110 that is coupled to the shaft of the take up reel 108 by means of slip clutch 112. Additionally, a motor 114 is coupled through a slip clutch 116 to the shaft of the supply reel 106. A sprocket wheel 107, having a plurality of sprockets 109 threaded into the sprocket holes of the film 102, prevents the updating film 102 from moving as long as a spring biased pawl 111 rests in one of the notches 113 on a rotary cam 115 that is coupled to the sprocket wheel 107. Movement of the film 102 is permitted when a solenoid 104 momentarily pivots the pawl 111 out of a notch 113 and the cam 115 rotates to the next notch 113. Such rotation moves the updating film 102 a distance equal to one data frame.

A reading head or station 116 is included in the control means 100 to read the control information marks 105 on the film 102. The reading head 116 includes a light source 117 that is mounted in a holder 118 on one side of the updating film 102 directly opposite a plurality of light sensors such as photocells 119, mounted in the holder 118 on the other side of the updating film 102. The reading head 116 is coupled to be moved transversely across the updating film 102 by means of a drive mechanism 121. The drive mechanism 121 moves the reading head 116 in incremental steps across the film 102 to be aligned consecutively with each group of the control information marks 105 on the film strip 102 so as to read these groups successively.

Figure 4:
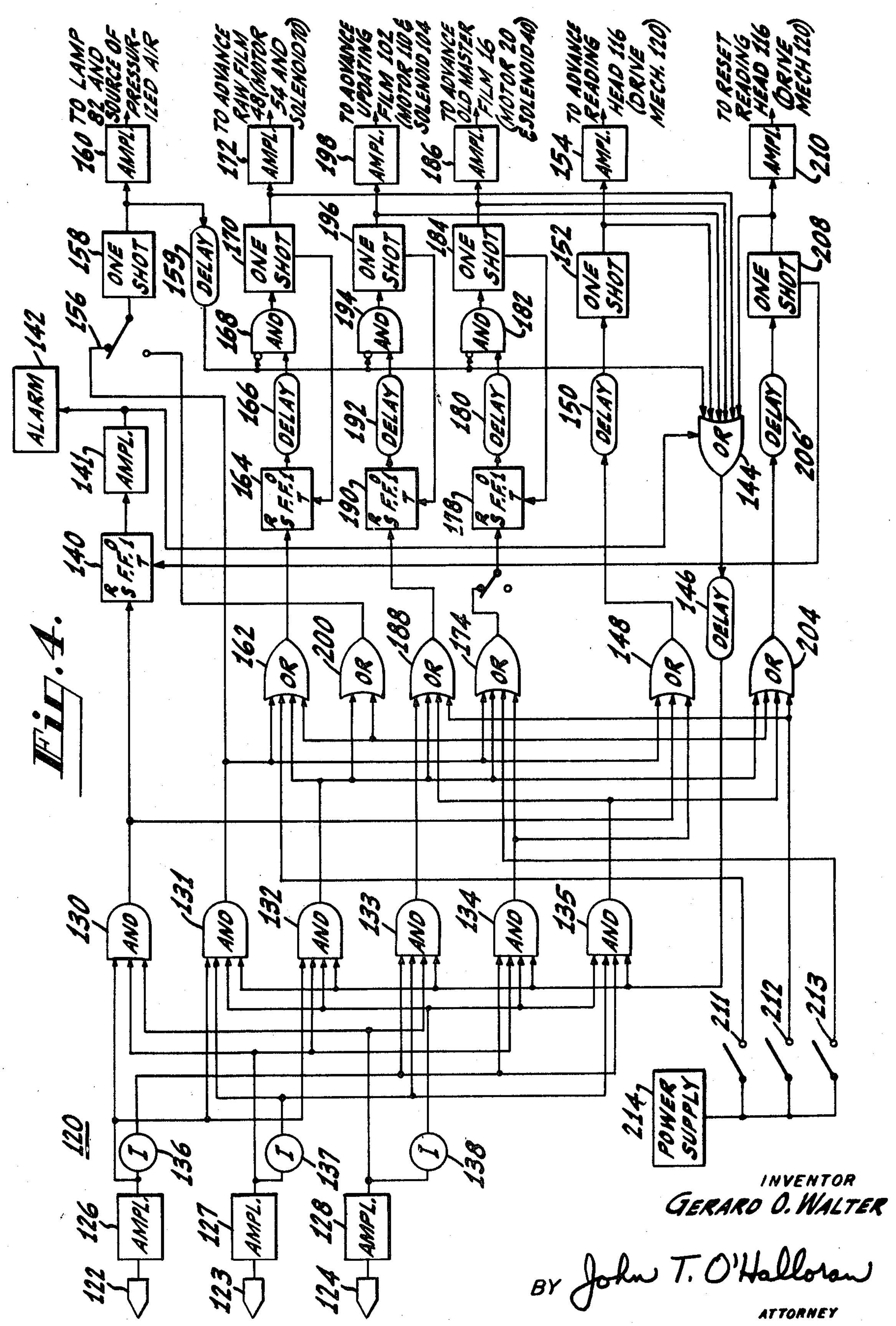
FIG. 4 is a schematic block diagram of a control electronic unit incorporated in the film merging unit.

The control information marks 105 when read by the reading head 116 apply input signals to a control electronic unit 120 which is shown in detail in FIG. 4. The control electronic unit 120 generates command signals that control the motion and contact printing of the film strips 16, 48 and 102.

There are three light sensors or photocells 122, 123 and 124 mounted in the reading head 116 and these provide the coded information input signals to the unit 120. The amount of light penetrating through the control marks 105 and impinging on the photocells determine which input signals are applied to the control unit 120. The signals sensed in the photocells 122—124 are amplified in corresponding amplifiers 126, 127 and 128 and selectively applied to a plurality of AND gates 130, 131, 132, 133, 134 and 135. The signals are also inverted in inverters 136, 137 and 138 and these inverted signals are also selectively applied to the AND gates 130 through 135.

A summary of the various coded control information input signals to the control electronic unit 120 and the control signals produced therefrom are shown in the table in FIG. 5. A check (√) denotes the control signal produced for each coded input signal. It is to be noted that in the first pass mode of operation of the unit 10, some of the coded control information input signals mean one thing, whereas in the second pass mode of operation, these same coded signals mean a different thing. This is, of course, due to the fact that on the first pass, the data frames from the old master film 16 are contact printed onto the raw film 48, whereas on the second pass, the data frames from the updating film 102 are printed onto the raw film 48. Since the coded control information marks do not change from one pass to another, these marks must be decoded differently on each pass.

A physical description of the various operations of the control electronic unit 120 now follows. The AND gate 130 is activated when the coded control information signal 1 1 1 is received. The AND gate 130 when activated sets a flip-flop 140 which produces an output signal from the "1" output terminal thereof. This signal is amplified in an amplifier 141 and is utilized to disable an alarm 142. The signal 1 1 1 therefore effectively denotes that the updating film 102 is accurately positioned for reading the control information marks 105 thereon. Such an accurate positioning signal is fed back from the amplifier 141 through an OR gate 144 and a delay circuit 146 to each of the AND gates 131 through 135. These gates are therefore enabled to receive the next coded control information signal. 152.

The output of the AND gate 130 is also applied through an OR gate 148 and a delay circuit 150 to trigger a one-shot multivibrator ! The one-shot multivibrator 152 produces an output pulse that is amplified in an amplifier 154 and applied to the reading head driving mechanism 120 to advance the reading head 116 to read the next group of three coded control information marks on the updating film 102.

The AND gate 131 is activated upon receipt of the coded control information signal 1 0 0 and produces an output signal that is applied through a single-pole double-throw switch 156 to a one-shot multivibrator 158 when the switch 156 is in the upper position thereof. The switch 156 is in this upper position in the first pass mode of operation, i.e., when the old master film 16 is being passed through the printing station 18. The one-shot multivibrator 158, when activated, produces an output pulse that is amplified in an amplifier 160 and applied to lamp 82 in the printing station 18 to pulse this lamp on to print a data frame of the old master film 16 onto the raw film 48. The signal is also applied to the pressurized air unit to fill the plastic bag 80 with air and force the old master film 16 and the raw film 48 into intimate contact with each other. The light from the lamp 82 therefore produces a contact print of a data frame from the old master film 16 on the raw film 48.

The output of the AND gate 131 is also coupled through an OR gate 162 to set a flip-flop 164 to produce an output signal from the "1" output terminal thereof. The output signal from the flip-flop 164 is delayed in a delay circuit 166 and applied to AND gate 168. The output of the one-shot multivibrator 158 is also coupled through a delay circuit 159 and applied to an inhibit terminal of the AND gate 168 so that the substantially simultaneous arrival of these two signals block the gate 168. The inhibit terminal of the AND gate is denoted by a small circle. When the output of the multivibrator 158 terminates, the AND gate 168 fires. A one-shot multivibrator 170 is activated by the firing of the gate 168 so as to produce an output pulse that is amplified in an amplifier 172 and applied to the driving means to advance the raw film 48, to the next data frame position. Thus, the gate 168 is activated after the delay introduced by the delay circuit 159. The reason for delaying the output of the AND gate 168 is to insure that a good contact print is made before the raw film 48 is advanced to the next frame. The one-shot multivibrator 170 when activated also resets the flip-flop 164 to prepare for succeeding input signals.

The output of the AND gate 131 is also coupled through OR gate 174 and through switch 176 to set a flip-flop 178. The flip-flop 178 when set produces an output signal which is delayed in delay circuit 180 and applied to an AND gate 182 along with the delayed signal received from the one-shot multivibrator 158. The signal from the multivibrator 158 is applied to the inhibit terminal of the gate 182. The AND gate 182 is activated after a delay and fires a one-shot multivibrator 184. The multivibrator 184 produces an output pulse that is amplified in an amplifier 186 and applied to advance the old master film 16. The one-shot multivibrator 184 is also coupled back to reset the flip-flop 178. The switch 176 is in the up position on the first pass mode of operation of the film merging unit 10. Thus, the result of the control information code 1 0 0 is to copy the old data from the master film 16 onto the raw film 48 and advance both to the next frame.

The AND gate 132 is activated when the coded signal 1 1 0 is received. When activated, the AND gate 132 produces an output pulse that is coupled through an OR gate 188 to set a flip-flop 190 to produce an output pulse that is delayed in a delay circuit 192 and applied to an AND gate 194. The AND gate 194 is already enabled by the absence of a signal from the one-shot multivibrator 158. The gate 194 is therefore activated and fires a multivibrator 196. The output from the one-shot multivibrator 196 is amplified in an amplifier 198 and applied to advance the updating film 102. The one-shot multivibrator 196 also resets the flip-flop 190.

The AND gate 132 when activated also applied a signal through an OR gate 200 to the switch 156. However, when the switch 156 is being operated in the first pass mode of operation this signal has no affect. The output of the AND gate 132 is also applied through the OR gate 174 to produce an output pulse to advance the old master film when the switch 176 is in the upper position thereof. The AND gate 132 also advances the raw film by applying a signal through the OR gate 162. All of these advances are done without delay because no printing is done with the signal 1 1 0. Finally, the output signal of the AND gate 132 is also applied through an OR gate 204 and a delay circuit 206 before application to a one-shot multivibrator 208. The one-shot multivibrator 208 when activated produces an output pulse that is amplified in an amplifier 210 and applied to the photocell drive means to return the photocells in the reading station to their initial position. The one-shot multivibrator 208 also resets the flip-flop 140 to permit the fault alarm 142 to receive the next disabling signal on the next frame of the control strip. The one-shot multivibrator 208 is also coupled back through the OR gate 144 to apply an enabling pulse to the AND gates 130 through 135. Thus, the result of the control information code 1 1 0 is to omit copying a data frame from the old master film so as to leave a blank to permit the insertion of a new data frame on the raw film.

The AND gate 133 is activated upon receipt of the coded information signal 0 0 1. The AND gate 133 when activated produces an output signal that is applied through the OR gate 162 to produce a pulse from the amplifier 172 that advances the raw film 48. The output of the AND gate 133 is also coupled through the OR gate 200 to apply a print signal when the switch is in the lower position thereof. The additional results of the signal 0 0 1 are shown in FIG. 5. The result of the signal 0 0 1 is to leave a blank in the raw film for inserting a new and additional data frame therein.

The AND gate 134 is activated upon receipt of the coded control information input signal 0 1 0. When activated, the output of the AND gate 134 is coupled through OR gate 174 to produce an output control signal to advance the old master film. The AND gate 134 also advances the reading head 116. The result of the signal 0 1 0 is to delete an old data frame without the substitution of a new data frame.

The AND gate 135 is activated upon receipt of the coded control information input signal 0 0 0. When activated, the AND gate 135 applies an output signal through the OR gate 188 to advance the updating film and apply a signal through the OR gate 204 to return the reading head to its original position as well as resets the fault indicator 142. The result of the signal 0 0 0 is to advance the control film 102 to read the information marks on the next data frame.

A plurality of manual switches 211, 212, and 213 are incorporated in the control electronic unit to connect the power supply 214 to the control electronic unit to manually obtain simulated control signals. When the switch 211 is closed, the raw film is advanced. When the switch 212 is closed, the updating film is advanced. When the switch 213 is closed, the old master film is advanced.

Operation

The updating of an old master film 16 is done in accordance with the information contained on a control strip that includes new data frames such as the updating film 102. Two passes of the raw film 48 past the reading station are made in order to convert the raw film 48 into a new updated film. On the first pass, the film merging unit is operated as shown in FIG. 1.

On the first pass, the data on the old master film 16 is transferred onto the raw film 48 in accordance with the instructions contained in the coded control information marks 105 on the updating film strip 102. The coded control information marks 105 are read and interpreted according to the upper portion of the table in FIG. 5. Each data frame that is to be transferred from the old master film onto the raw film has to be previously noted in coded form on the control strip 102. Accordingly, the beginning of the films 16, 48 and 102 have to be carefully aligned. As each coded control information mark is read and decoded, the old and raw films are stepped along with blank frames being left in the raw film, for the later insertion of updated frames therein. Frames are also deleted from the old master film with no corresponding substitution of a new frame therefore. After all the information has been transferred to the raw film 48 in the first pass of the raw film 48, the old master film 16 is removed from the film merging unit. The updating film 102 is inserted to be driven past the reading station 18 as shown in FIG. 3. It is to be noted that in the embodiment 10, the coded control information marks on the updating film 102 have to be spaced a distance of a few frames, say eight frames, from the frame that is controlled by these control marks. This is because the reading and printing stations are too bulky to read control information marks from the same data frame that must also be contact printed.

On the second pass, the coded control information marks have the meaning shown in the lower half of the table of FIG. 5. In order for the same control marks to control different things on the second pass, it is necessary that the switches 156 and 176 be thrown to their lower position to reroute the input signals to provide the correct output control signals. The second pass transfers the updating frames from the updating film 102 onto the blank spaces left on the raw film 48. This is accomplished by now interpreting every first pass print command (i.e., signal 1 0 0) as merely an advance command to step the raw film 48 along. Then the first pass "no print" commands 1 1 0 and 0 0 1 are interpreted as print on the second pass. Thus, each of the blank frames on the raw film 48 are filled in with no blank frames left therein. This is done automatically without manual cutting and splicing operations.

Figure 6:
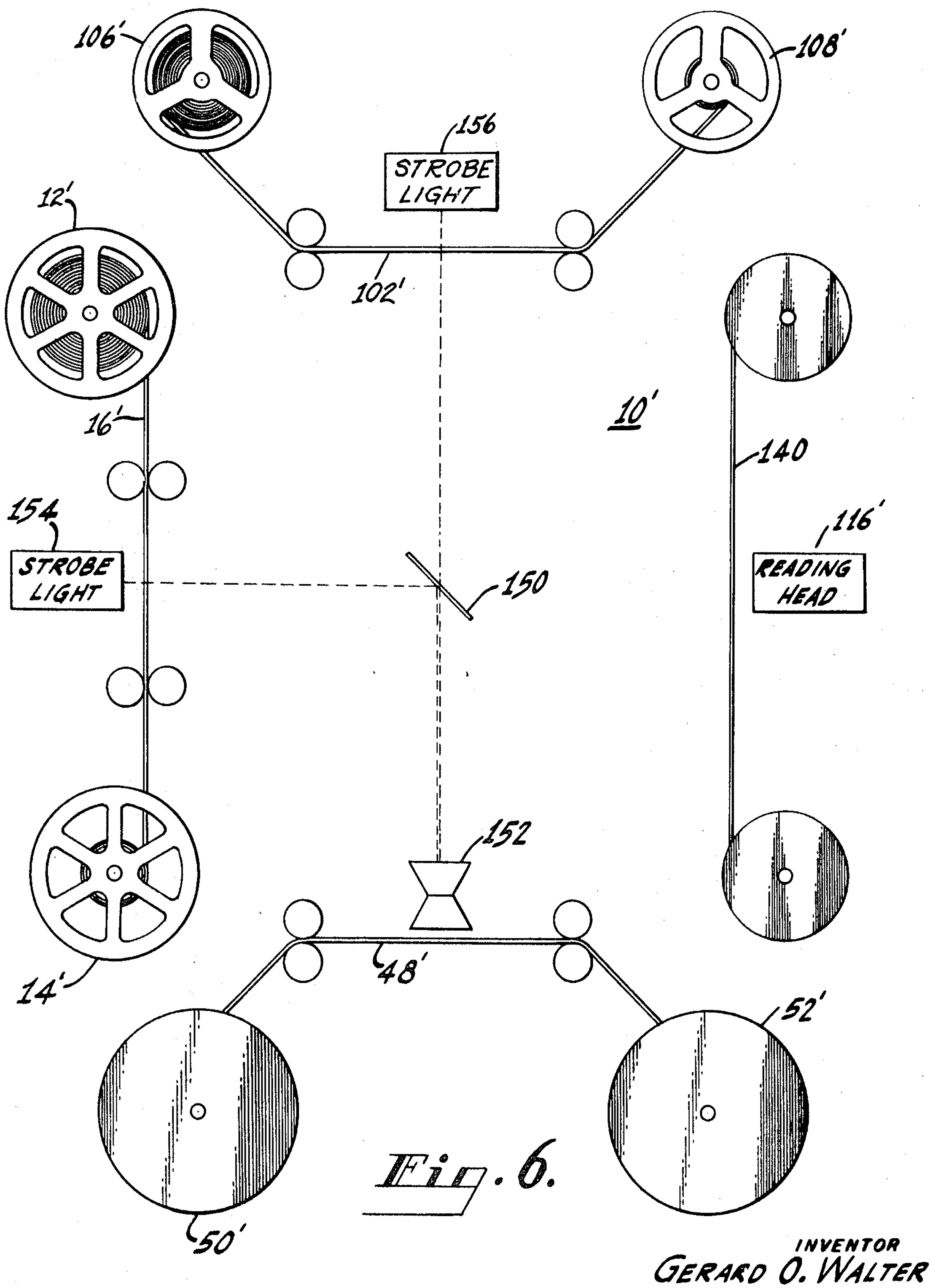
FIG. 6 is a schematic diagram of another embodiment of a film merging unit.

In FIG. 6 there is shown another embodiment 10' of the invention. In this embodiment of the invention which is a one pass system, all of the reference numerals referring to parts identical to those in FIG. 1 are the same as those in FIG. 1, but the reference numerals in FIG. 6 have been primed for distinguishing them. In FIG. 6, the system 10′ provides an updated raw film 48′ on only one pass of the film 48′. In this system 10′, the control strip 140 is solely a control strip and does not contain any photographic data frames at all. The control strip 140 of a single pass system 10′ may, for example, be a magnetic control tape, a paper control tape, etc. Such a control tape is provided by an electronic photocomposition system similar to the type previously described. The single pass system includes a half silvered mirror 150 that permits light derived from the old master film 16′ to be reflected onto the raw film 48′ through a lens 152. When the old master film is strobed by a strobe light 154 on command from a control signal from the control electronic unit, the data frame therefrom is transferred to the raw film 48′. When a new data frame from an updating film 102′ is to be transferred to the raw film 48′, the film 102′ is strobed by strobe light 156 and the image is transmitted through the clear half of the mirror 150 onto the raw film 48′. Only one pass of the raw film 48′ occurs in this system. The control electronic unit requires additional channels (not shown) for providing control signals to advance the control strip 140 and to pulse the strobe lights 154 and 156.

Thus, in accordance with the invention a film merging unit has been provided that permits an old master film to be updated in accordance with coded control information marks that control the merging of updating frames with the unchanged old data frames onto an entirely new film. This is done automatically at a speed greatly increased over the previous manual type of operation.

What I claim is:

1. A film merging unit for merging data on a master film and data on an updating film onto a raw film to produce a new updated film, comprising in combination, a printing station for transferring data from said master film onto said raw film and for transferring data from said updating film onto said raw film, a plurality of drive means, one for each of said films, control means for reading a control strip containing coded control marks to produce control signals, and means for applying said control signals to activate selected ones of said drive means to sequence the relative positionings of said films with respect to said printing station for controlling the order in which said data are transferred to said raw film.

2. The combination in accordance with claim 1 wherein said control means comprises a reading station for reading said coded control marks from said control strip, and a control electronic unit for decoding said coded control marks to provide said control signals.

3. The combination in accordance with claim 2 wherein said data is recorded on said films by frames.

4. The combination in accordance with claim 3 wherein said drive means includes an incremental drive attachment for driving said films in incremental steps substantially equal to a data frame length so that frames of data are transferred onto said raw film.

5. The combination in accordance with claim 2 wherein said control strip containing said coded control marks is incorporated onto one of said films, and data from said master film are transferred to said raw film on one pass of said films through said printing station and data from said updating film are transferred to said raw film on another pass of said films through said printing station.

6. The combination in accordance with claim 2 wherein said control strip is separated from said films to control the transfer of data from said master film and said updating film onto said raw film on one pass of said films through said printing station.